THOMAS R. STOCKTON,
INVENTOR

BY
ATTORNEYS

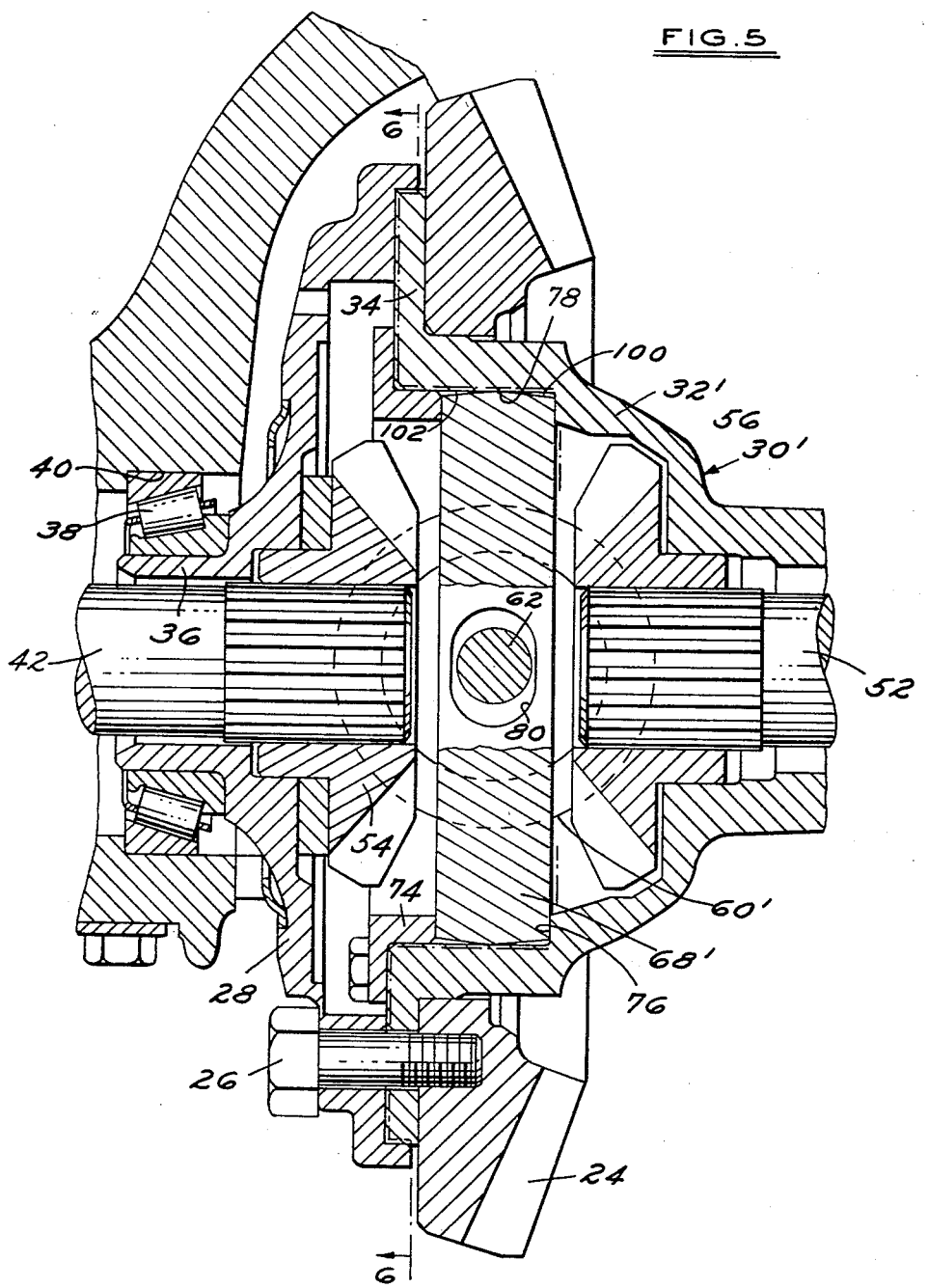

THOMAS R. STOCKTON,
INVENTOR

ATTORNEYS

United States Patent Office 3,396,609
Patented Aug. 13, 1968

3,396,609
POSITIVE DRIVE TRACTION DIFFERENTIAL WITH INERTIA DISC
Thomas R. Stockton, Ann Arbor, Mich., assignor to Ford Motor Company, Dearborn, Mich., a corporation of Delaware
Filed Apr. 27, 1967, Ser. No. 634,210
6 Claims. (Cl. 74—711)

ABSTRACT OF THE DISCLOSURE

This specification discloses a geared torque transmitting differential for use in an automotive vehicle driveline. It includes an inertia disc that is drivably connected to differential pinion gears when differential motion occurs between the pinion and the differential carrier. This establishes a torque bias in the driveline that tends to equalize torque distribution to each axle shaft regardless of variations in the effective coefficient of friction for one traction wheel with respect to the corresponding coefficient for the other.

BRIEF SUMMARY OF THE INVENTION

My invention is adapted especially to be used for delivering torque from the output shaft of a multiple ratio power transmission mechnism in an automotive vehicle driveline to each of two axle shafts associated with the traction wheels for the vehicle. The improvements of my invention readily can be adapted to known designs of differential gear mechanisms. These include a differential ring gear carried by a differential carrier which in turn is journaled rotatably in an axle housing. The ring gear is driven by a drive pinion that in turn is powered by the driveshaft of the automobile vehicle driveline.

The differential carrier encloses a pair of differential side gears, each side gear being connected to a separate axle shaft. Differential pinions located within the carrier engage drivably the side gears. Each pinion meshes with both side gears. The pinions are journaled rotatably on a pinion shaft which in turn is fixed to the carrier. Thus if the tractive effort at one traction wheel is the same as the tractive effort at the other wheel, torque will be distributed uniformly from the drive pinion to the axle shafts. If one axle shaft rotates faster than the other, the differential pinions will rotate to accommodate the differential motion of the axle shafts.

If the coefficient at one traction wheel is reduced relative to the coefficient at the other wheel, there will be a tendency for one axle to be overspeeded with respect to the other. This limits the amount of torque that can be distributed to the traction wheels. To overcome this problem, it is common practice in the industry to provide a friction clutch means for inhibiting rotation of one differential side gear with respect to the differential casing. Such mechanisms provide a torque bias, the magnitude of which is dependent upon the ability of the friction elements to distribute torque through the differential clutch structure. If the friction elements of the clutch structure should become worn, the positive drive characteristics of the differential are not available. In addition to the undesirable wear characteristics of conventional positive drive differential mechanisms, the friction clutch structure itself requires a space penalty since the clutch discs or the cone-clutch mechanism, depending upon the clutch design that is used, must be located within the differential carrier. Provision must be made also for servicing the clutch discs.

My improved clutch structure avoids the shortcomings in such prior art mechanisms since it does not require a friction clutch of this sort. It instead employs an inertia disc that is situated within the carrier between the two differential side gears. It is engageable with the differential pinions and it is caused to oscillate about the axis of the axle shafts when the differential pinions are rotated relative to the case. The inertia forces introduced into the differential gear system by reason of the oscillation of the inertia disc produce a torque bias that permits torque distribution to each axle shaft regardless of whether one traction wheel loses traction with respect to the road surface.

It is a further object of my invention to provide a differential gear mechanism having an inertia disc of the type above set forth wherein the disc is formed with gear teeth that are adapted to engage the teeth of the differential pinions. As the gear teeth of the disc mesh with the teeth of one pinion, the companion disc teeth move out of phase with respect to the other differential pinion.

It is another object of my invention to provide a differential gear mechanism of the type above set forth wherein the inertia disc is formed with a tapered outer periphery to define cone clutch surfaces that register with cooperating friction surfaces in the differential case, and wherein the friction surfaces of the case and the inertia disc are brought into frictional engagement by the axial component of the gear tooth forces acting on the inertia disc thereby supplementing the torque bias due to the inertia forces created by angular displacement of the inertia disc.

BRIEF DESCRIPTION OF THE FIGURES IN THE DRAWINGS

FIGURE 3 is a partial cross-sectional view taken along the plane of section line 3—3 of FIGURE 2.

FIGURE 5 is a longitudinal cross-sectional view showing a second form of my invention.

PARTICULAR DESCRIPTION OF THE INVENTION

Figure 1:
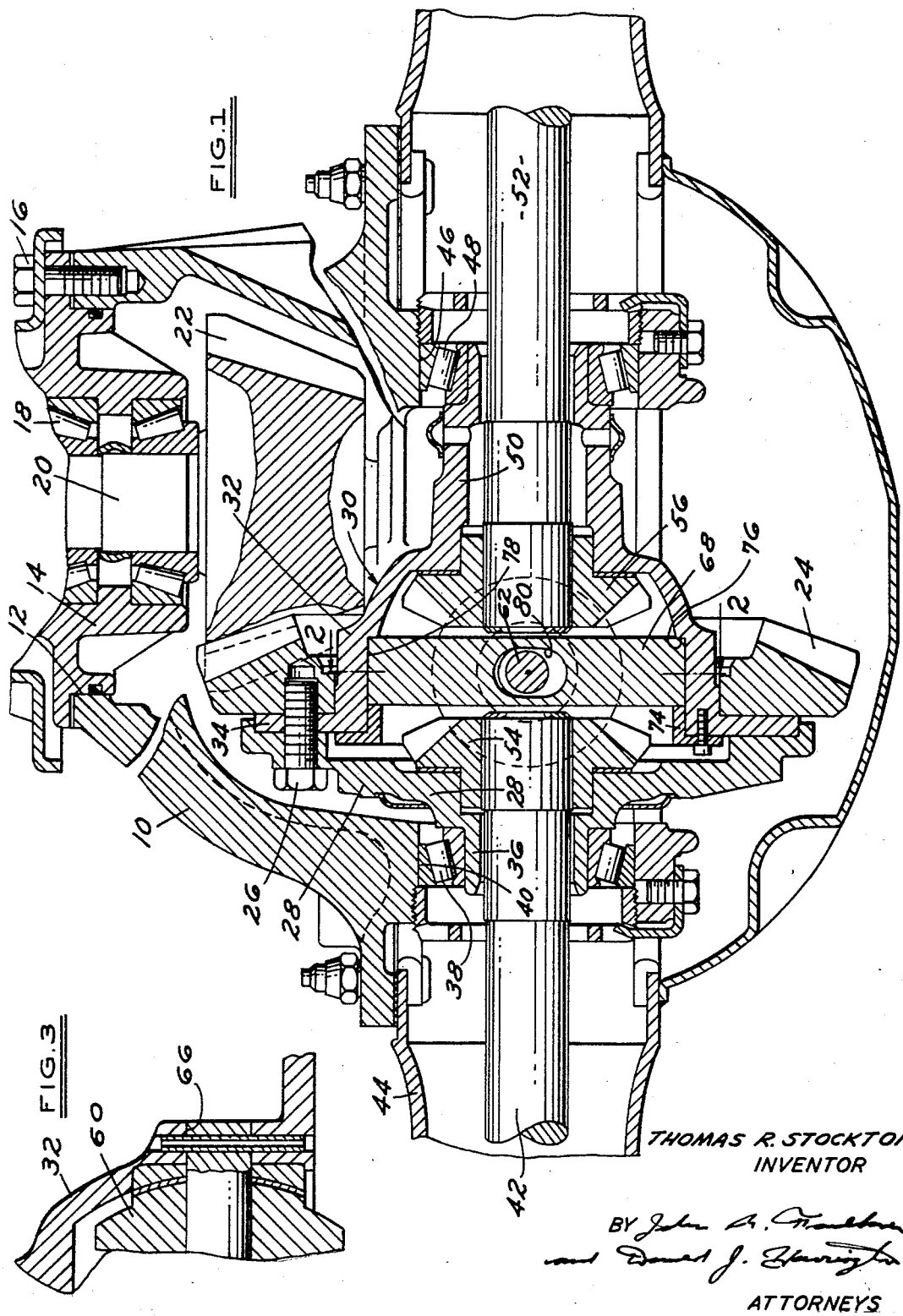
FIGURE 1 shows in longitudinal cross-sectional form a first embodiment of my invention.

Numeral 10 designates the differential housing. It includes a housing portion formed with opening 12 which receives therein a bearing support 14. Bolts 16 secure the support 14 to the housing 10. Roller bearings 18 journal a pinion shaft 20 which carries a differential bevel pinion. This pinion drivably engages a bevel differential ring gear 24 which is bolted by bolts 26 to a differential carrier housing part 28. Part 28 forms one part of a differential carrier housing indicated generally at 30. The housing 30 is defined also by a part 32, the periphery 34 of which is bolted by the bolts 26 to the ring gear 24.

A hub 36 for the part 28 is journaled by means of tapered roller bearings 38 within opening 40 formed in the housing 10. A first axle shaft 42 extends through the hub 36. An axle shaft extension housing 44 connected to the housing 10 surrounds shaft 32. The outboard end of shaft 42 is connected to a drivewheel in the usual fashion.

The housing 10 has a second opening 46 for tapered roller bearing 48 which journals rotatably the hub extension 50 for the carrier housing part 32. A second axle shaft 52 extends through the hub extension 50 and is connected at its outboard end to a second vehicle drive or traction wheel.

A first differential side gear 54 mounted within the carrier housing 30 is splined directly to the shaft 42. A second differential side gear 56 mounted in juxtaposition with respect to the gear 54 within the housing 30 is splined to the shaft 52.

Figure 2:
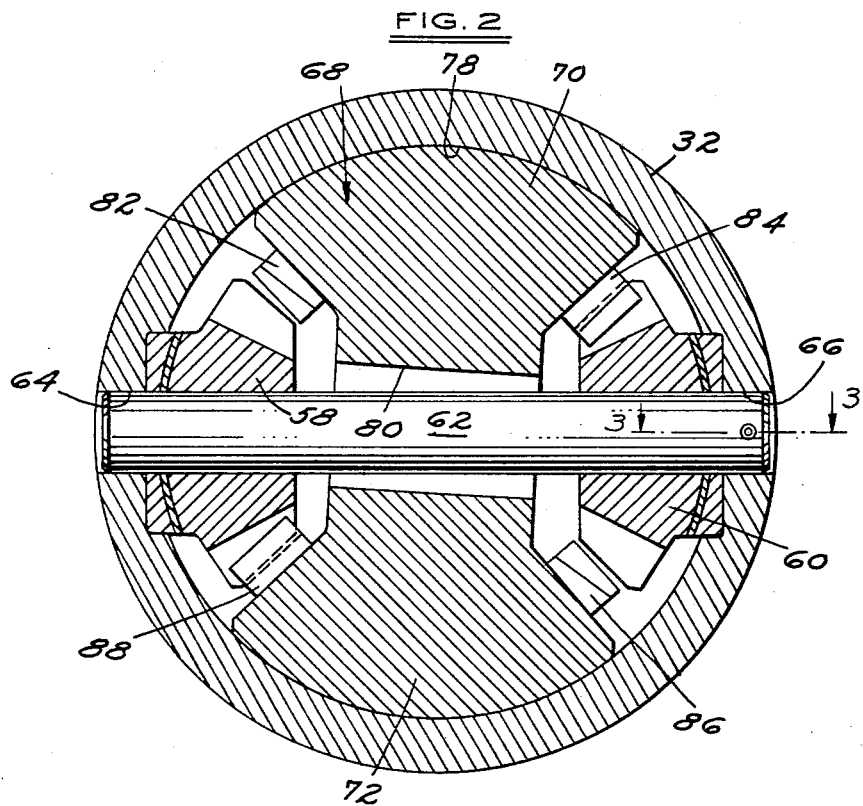
FIGURE 2 is a transverse cross-sectional view taken along the plane of section line 2—2 of FIGURE 1.

Gears 54 and 56 are bevel gears which drivably engage a pair of differential pinions 58 and 60 as seen in FIGURE 2. These are journaled rotatably on a pinion shaft 62, the ends of which are received in pinion shaft openings formed in housing part 32 as shown at 64 and 66.

A differential inertia disc 68 is located within the housing 30 between the gears 54 and 56. It includes two segmental parts 70 and 72. A retainer ring 74 is received within the housing part 32 and is situated adjacent the disc 68 for resisting axial displacement of the disc 68 with respect to the housing 30. Axial displacement of disc 68 is inhibited also by a shoulder 76 formed in the housing part 32.

An adequate clearance exists between the outer periphery of the segmental disc parts 70 and 72 and the interior cylindrical wall 78 of the housing part 32.

The center of the disc 68 is formed with a central opening 80 through which the pinion shaft 62 extends. As seen in FIGURE 1, the opening 80 is elongated in shape to permit oscillating motion of the disc 68 about the axis of the shafts 42 and 52.

Figure 4:
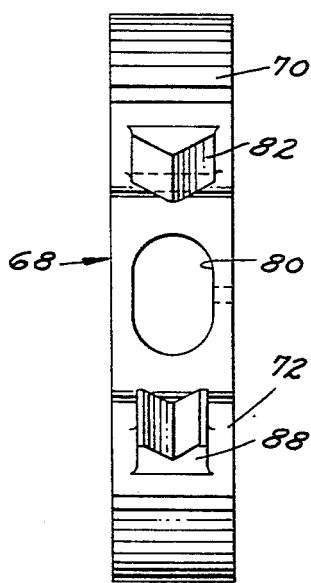
FIGURE 4 is a side elevation view of the inertia disc used in the structure of FIGURE 1.

The sides of the segmental part 70 of the disc 68 are formed with gear teeth. A single tooth 82 is formed on one side of part 70 and a double tooth 84 is formed on the other side. In similar fashion the two sides of the segmental disc part 72 are formed with gear teeth, one side having a single tooth 86 and the other side having a double tooth 88. The configuration of the teeth 82 and 88 is best seen in FIGURE 4. The teeth 84 and 86 correspond, respectively, to teeth 82 and 88 as seen in FIGURE 4.

The teeth 82 and 86 are out of phase with respect to teeth 88 and 84. In the embodiment shown, the pinion 58 has the same number of teeth as the pinion 60.

In FIGURE 2 teeth 88 are in meshing engagement with the teeth of the pinion 58. The angular displacement of the tooth 82 with respect to the teeth 88 is such that when the teeth 88 are in engagement with the teeth of the pinion 58, the tooth 82 is out of engagement with respect to the teeth of pinion 58. The converse is true for pinion 60. The spacing of the teeth 84 with respect to the tooth 86 is such that when the teeth 84 are out of engagement with the teeth of the pinion 60, the tooth 86 is in engagement with the teeth of the pinion 60, and vice versa.

Figure 9:
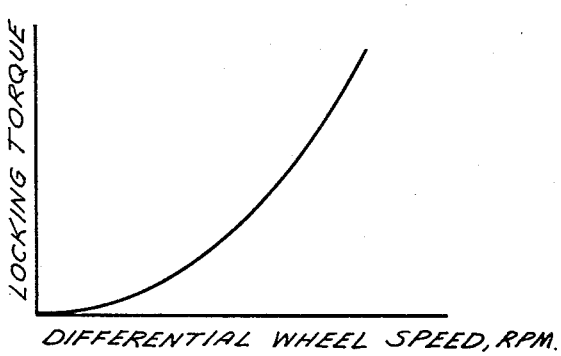
FIGURE 9 shows a chart of the variation in torque bias as the differential speed increases.

If it is assumed that the inertia disc 68 is positioned as shown at FIGURE 2, teeth 88 are in meshing engagement with the pinion 58 and teeth 84 are in meshing engagement with the pinion 60. When the pinions 58 and 60 rotate, teeth 88 fall out of engagement with the pinion 58 and teeth 84 move out of engagement with pinion 60. This causes an oscillating motion of the inertia disc 68 in a counterclockwise direction as viewed in FIGURE 2. This counterclockwise motion continues until teeth 88 and 84 are out of mesh with their respective pinions and teeth 82 and 86 drivably engage their respective pinions. Upon continued motion of the pinions 58 and 60 with respect to their own axes, disc 68 is oscillated in the opposite direction until teeth 88 and 84 again become drivably engaged by the disc 68. It is apparent, therefore, that the disc 68 will oscillate about its axis upon continued motion of the pinions 58 and 60. This introduces an inertia force that creates a torque bias in the differential gearing. This torque bias is identified in FIGURE 9 by a parabolic curve. The amount of the locking torque or bias will increase exponentially upon an increase in speed of the differential pinions with respect to their own axes.

It is possible to modify the gear tooth geometry of the pinion so that they will have an odd number of teeth. In such case the cooperating teeth of the inertia disc can be made similar. This is another method for accomplishing the proper phasing relationship of the disc and the pinion teeth so that one pair of teeth will enter mesh as the other leaves mesh.

Figure 6:
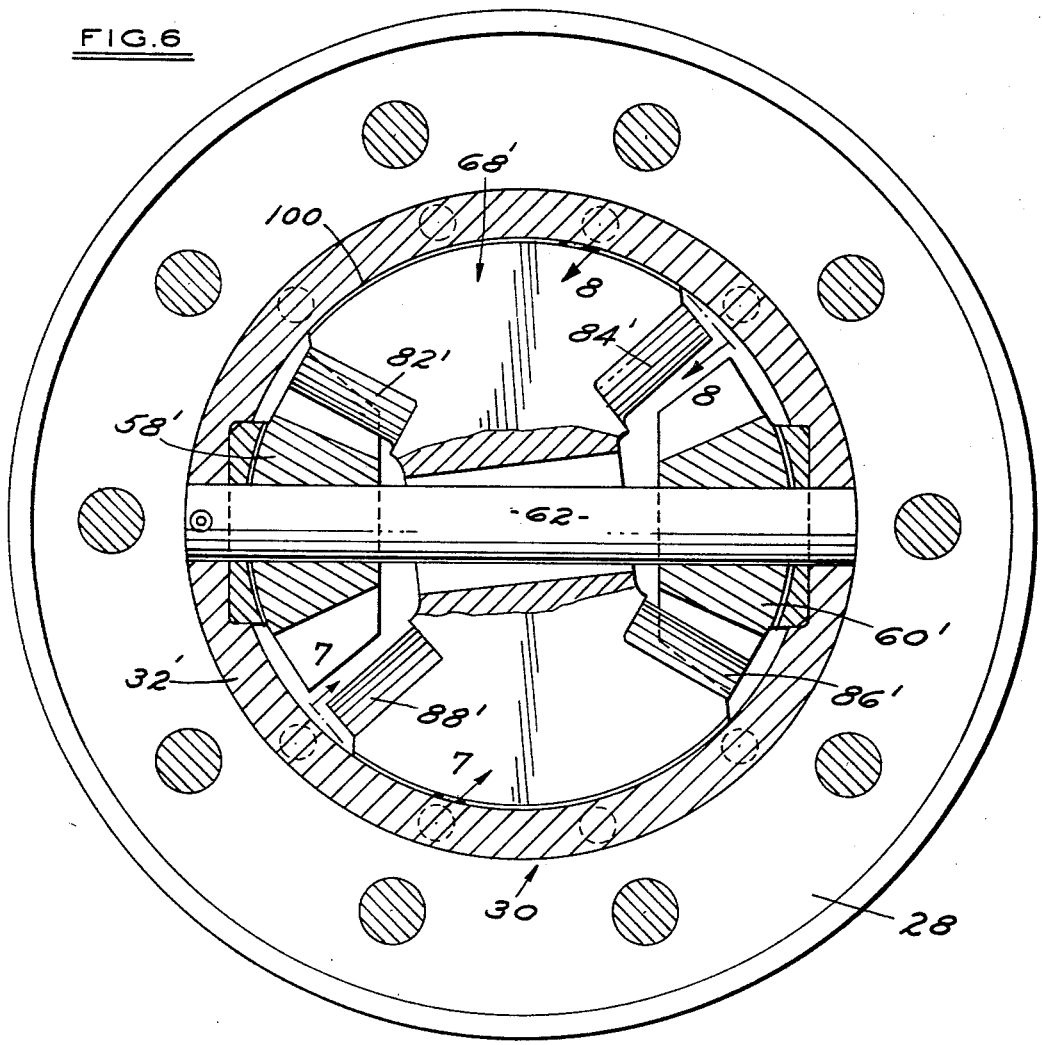
FIGURE 6 is a transverse cross-sectional view taken along the plane of section line 6—6 of FIGURE 5.
Figure 7:
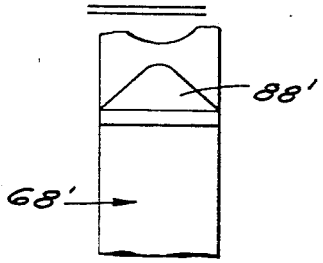
FIGURE 7 is a view of the inertia disc taken along the plane of section line 7—7 of FIGURE 6.
Figure 8:
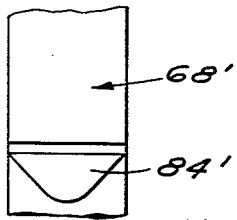
FIGURE 8 is a view of the inertia disc taken along the plane of section line 8—8 of FIGURE 6.

An alternate construction is indicated in FIGURES 5 through 8. The elements of the differential gearing that have counterpart elements in the differential gearing of FIGURES 1 through 4 have been indicated by similar reference characters although prime notations have been added. The inertia disc of the embodiment of FIGURES 5 through 8, however, has two pairs of identical gear teeth rather than pairs of gear teeth that are out of phase. By preference the disc 68' shown in FIGURE 6 is formed with a single gear tooth. As indicated at 84' in FIGURE 8, the gear tooth form for each of the other meshes is the same as indicated, for example, in FIGURE 7 at 88'.

In the embodiment of FIGURES 5 through 8, the differential pinions have an odd number of teeth. Thus a tooth space will be directly adjacent gear tooth 88' when tooth 82' meshes with the pinion 50'. The same phasing relationship exists for pinion 60' as its teeth register with the teeth 84' and 86'. As in the earlier embodiment, the teeth 82' and the teeth 86' enter meshing engagement together as the teeth 88' and 84' move out of meshing engagement with the differential pinions. Upon continued rotation of the differential pinions, however, teeth 82' and 86' will move out of meshing engagement with the pinions as teeth 88' and 84' move into engagement with the pinions. The resulting oscillating motion of the disc 68' will result in a torque bias in the differential system just as is the case of the earlier embodiment.

In the embodiment of FIGURES 5 through 8 the outer periphery of the inertia disc 68' is formed with cone clutch surfaces 100 and 102. These are adapted to register with the cooperating coned surfaces formed in the interior of the differential carrier housing part 32'.

The disc 68' in the embodiment of FIGURES 5 through 8 is adapted to shift slightly about an axis that is perpendicularly disposed with respect to the axis of the axle shafts. It tilts in this fashion in response to the axial component of the gear tooth forces acting on the inertia disc gear teeth. In this way the cone clutches are engaged and disengaged alternately when the carrier pinions rotate. This adds to the torque bias that is developed by reason of the inertia forces on the disc 68'.

What I claim and desire to secure by U.S. Letters Patent is:

1. A differential gear assembly comprising a power input shaft, a pair of axle shafts, a differential carrier, a driving connection between said carrier and said input shaft, a differential housing, said carrier being journaled rotatably in said housing for rotation about its axis, a pair of axle shafts mounted in said housing and extending into said carrier along an axis coinciding with the axis of rotation of said carrier, a pair of differential side gears in said carrier, differential pinions rotatably mounted in said carrier and meshing with said differential side gears, an inertia member situated between said differential side gears and adapted for oscillation about the axis of said axle shafts, and at least one pair of gear teeth formed on said inertia member, said pinions having gear teeth formed thereon that are engageable with the teeth of said inertia member, the phasing relationship between the teeth of said pinions and the teeth of said inertia member being such that one inertia member tooth registers with a pinion tooth as the other inertia member tooth moves out of meshing engagement with its associated pinion tooth, said inertia member thereby being oscillated about its axis upon relative rotation of said pinions with respect to said carrier.

2. The combination as set forth in claim 1 wherein said inertia member is formed with two pairs of teeth, the teeth of one pair being adapted to mesh with the pinion teeth of one differential pinion and the teeth of the other pair being adapted to register with the pinion teeth of the other differential pinion, one tooth of each pair of inertia member teeth being out of phase with respect to its companion tooth so that one inertia member tooth of each pair enters engagement with its associated pinion as the other inertia member tooth of that pair moves out of engagement with its associated pinion.

3. The combination as set forth in claim 1 wherein said inertia member is in the form of a disc, the outer periphery of said disc being slidably mounted in said carrier whereby said disc is adapted to oscillate about the axis of said output shafts on rotation of said pinions.

4. The combination as set forth in claim 2 wherein said inertia member is in the form of a disc, the outer periphery of said disc being slidably mounted in said carrier whereby said disc is adapted to oscillate about the axis of said output shafts on rotation of said pinions.

5. The combination as set forth in claim 3 wherein the periphery of said inertia disc has formed thereon cone clutch surfaces, cooperating cone clutch surfaces formed on the interior of said carrier, the axial component of the gear tooth forces created upon engagement of the teeth of said inertia disc with said differential pinions being effective alternately to engage and disengage said cone clutch surfaces thereby establishing and augmentation of the torque bias in said differential gearing upon rotation of said pinions with respect to said carrier.

6. The combination as set forth in claim 4 wherein the periphery of said inertia disc has formed thereon cone clutch surfaces, cooperating cone clutch surfaces formed on the interior of said carrier, the axial component of the gear tooth forces created upon engagement of the teeth of said inertia disc with said differential pinions being effective alternately to engage and disengage said cone clutch surfaces thereby establishing an augmentation of the torque bias in said differential gearing upon rotation of said pinions with respect to said carrier.

References Cited

UNITED STATES PATENTS

| 1,948,095 | 2/1934 | Boynton | 74—711 |
| 2,305,092 | 12/1942 | Lawrence | 74—711 |
| 2,750,813 | 6/1956 | Lyman | 74—711 |
| 3,059,503 | 10/1962 | Winters | 74—711 |

FOREIGN PATENTS 738,913   9/1943   Germany.

FRED C. MATTERN, JR., *Primary Examiner.*

T. C. PERRY, *Assistant Examiner.*